Figure 1:
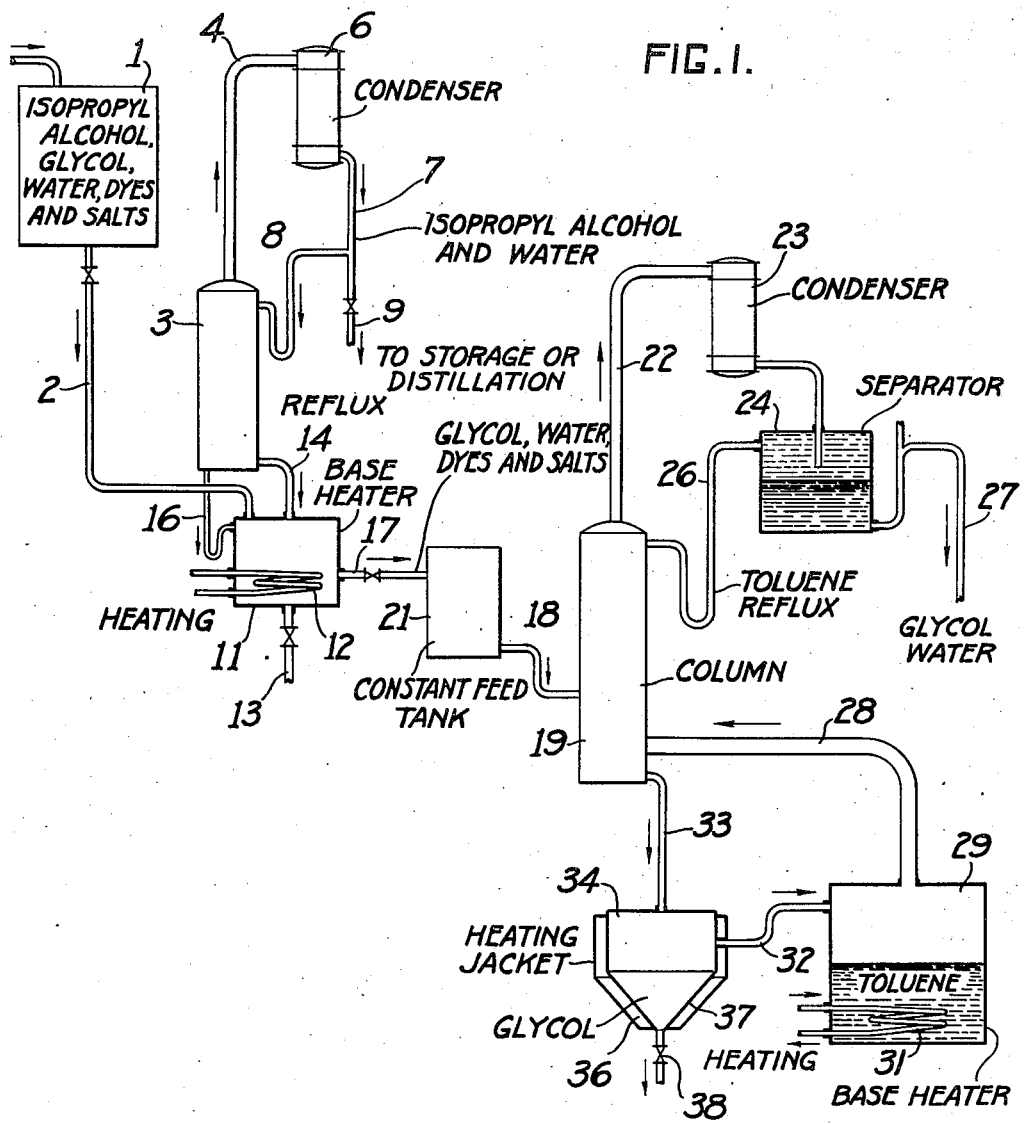

Oct. 15, 1940.   W. E. FISHER   2,218,234
PROCESS FOR THE RECOVERY OF ETHYLENE GLYCOL FROM AQUEOUS SOLUTIONS
Filed Dec. 9, 1937   2 Sheets-Sheet 2

Webster E. Fisher
INVENTOR
BY
ATTORNEYS

Patented Oct. 15, 1940

2,218,234

UNITED STATES PATENT OFFICE 2,218,234

PROCESS FOR THE RECOVERY OF ETHYLENE GLYCOL FROM AQUEOUS SOLUTIONS

Webster E. Fisher, Rochester, N. Y., assignor to Eastman Kodak Company, Rochester, N. Y., a corporation of New Jersey Application December 9, 1937, Serial No. 178,932

9 Claims. (Cl. 202—42)

This invention relates to the recovery of aliphatic hydroxy compounds from various waste solutions and more particularly to a distillation process for the recovery of glycols from admixture with water, dyes and salts.

Various organic compounds such as the monohydric alcohols, the glycols and the like, are used as solvents or for other purposes in industry. Consequently, in many instances waste and dilute solutions are produced which contain these valuable components. For example, in the photographic industry there is produced certain mixtures containing alcohol, glycol, water, dyes and salts. The recovery of the valuable constituents from such mixtures present some difficulties inasmuch as heating glycols to their boiling point incurs decomposition and other losses. Furthermore, in the presence of dyes there is attendant danger of the constituent discoloring as well as the dyes decomposing into tarry masses.

Consequently, in many instances in the prior art, vacuum distillation has been employed. This, of course, entails considerable expense and in many instances equipment for producing a sufficiently high vacuum is not readily obtainable or on hand.

I have discovered a method whereby such glycol solutions may be treated for recovering valuable components therefrom. My novel method is relatively simple and without the disadvantage of requiring special or a relatively non-available material or equipment. In fact, my process may be readily carried out with fairly simple equipment somewhat similar to that used in standard distillation procedure.

This invention has for one object to provide a process for recovering alcohol, glycol or other valuable components from dilute, aqueous or other type waste solution containing such materials. Another object is to provide a simple and efficient process for the recovery of glycols from aqueous waste solutions in which vacuum may be employed but is not essential. Still another object is to provide a distillation process for the recovery of glycol from waste solutions which process may be carried out at temperatures below the decomposition temperature of glycol. A still further object is to provide a distillation process for the recovery of gylcol from admixtures containing the glycol in the presence of water, dyes and salts. A still further object is to provide a process for distilling aqueous glycol solutions in the presence of hydrocarbon entraining agents boiling between 100° C.–140° C. A still further object is to provide a process for recovering a glycol containing a substantial content of water from waste solutions containing dyes and salts. Still another object is to provide a process for the distillation of monohydric and polyhydric alcohol solutions which may be carried out in relatively simple distillation apparatus. Another object is to provide a process for separating gylcol or other polyhydroxy alcohols from unclear aqueous admixture wherein the glycol and alcohols are obtained as head products. Other objects will appear hereinafter.

I have discovered a process for recovering the valuable alcohol and glycol components from waste solutions containing these components in the presence of water, dye and salts, which process does not require the use of high vacuum or other complicated procedure. By my novel procedure it is possible to recover the glycol without material decomposition and in a state of purity such that it may be re-utilized in photographic or other exacting processes. I have found that alcohol and water may be removed from the waste solutions at a sufficiently low temperature since these components form an azeotrope. Thereafter, the glycol component may be recovered at a temperature below its decomposition and decoloration temperature by employing the procedure and the various agents which I describe in detail herein.

For a more complete understanding of my invention, reference is made to the attached drawings forming a part of the present application. The attached drawings are in the nature of a flow sheet showing types of apparatus arrangement which have been found to be satisfactory for carrying out my process.

Figure 2:
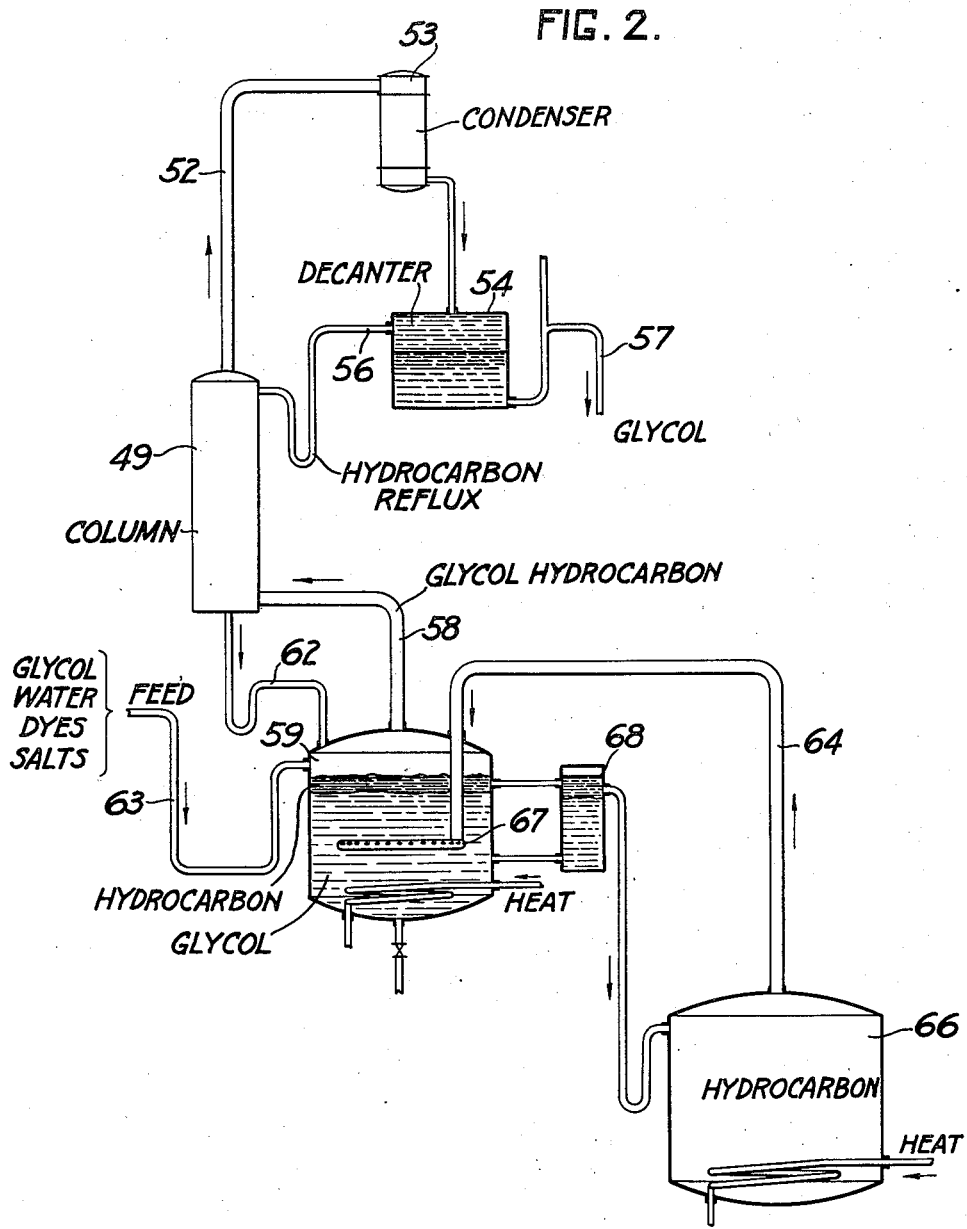

Fig. 1 represents the preferred embodiment. Fig. 2 represents another arrangement which might be used if anhydrous glycol was desired.

In the drawings, I represents a storage tank or reservoir in which the waste solution to be treated is placed. This tank is connected by valved conduit 2 to an intermediate section or base heater of a distillation column 3.

The distillation column 3 is of more or less standard construction and includes the vapor off-take conduit 4 which leads to a condenser 6. The condenser in turn is provided with a branched conduit, weir box, decanter, separator or other type standard construction 7. This device is provided with a reflux conduit 8 that leads back to the upper portion of column 3. Another conduit 9 is provided for withdrawing alcohol from the system to storage or distillation. The lower portion of the column is equipped with a heating device or base heater 11. This base heater may be of conventional construction and include suitable heating coils 12 and a valved draw-off conduit 13 in the base thereof. The base heater is also connected to the column by means of the conduits 14 and 16.

This distillation equipment is connected by means of conduits 17 and 18 to another column 19. In the line 17—18 there might be interposed a storage and/or constant feed tank 21 which serves to improve the operation of the system.

Column 19 may be more or less similar to column 3 and comprise a conventional bubble cap type of column. The upper portion of this column is provided with a vapor off-take conduit 22 which leads through a condenser 23 to a decanter 24. This decanter is provided with a reflux conduit 26 that leads back to the column and another conduit 27 for draw-off purposes.

However, with respect to the lower portion of column 19 there are certain noticeable differences of construction. The lower portion of the column is connected by conduit 28 to a base heater or still pot 29. This unit will be equipped with suitable heating means such as the heating coils 31. It is, of course, apparent that the unit might be enclosed in a heating jacket or other type of construction employed.

The base heater 29 is also connected by conduits 32 and 33 to column 19. Interposed in this line 32—33 is a heated settling tank 34. This tank may be steam jacketed at 36. The settling tank is equipped with a suitable cone-shaped bottom 37 provided with a valved draw-off conduit 38.

In Fig. 2, 49 represents a column similar to 19 of Fig. 1. Likewise, the vapor off-take conduit 52, condenser 53 and decanter 54 are similar to those already described. A reflux line 56 and draw-off line 57 also are provided.

However, the lower parts of the apparatus are somewhat different. Conduits 58 and 62 are provided for connecting column with still pot 59 of usual construction. In this arrangement, however, there may be provided a feed line 63 leading to the still pot.

There is also provided another line 64, which leads from the agent vaporizer and/or superheater 66 into the still pot. This line may terminate in a diffuser or other device 67. The still pot may also be provided with a side separator 68, which in turn may be connected to vaporizer 66.

As will be apparent as the description proceeds, the arrangement of Fig. 2 provides another way whereby glycol may be kept out of direct contact with the heating coils which furnish the major heat input. In addition, by the set-up of Fig. 2, anhydrous glycol may be withdrawn at 57. That is, the water may be first removed. Thereafter hydrocarbon-glycol distills off, is decanted in 54 and the hydrocarbon returned to the column. The anhydrous glycol may be removed through 57.

The following example is set forth for the purposes of further illustrating my invention and setting forth the preferred embodiment of operation.

The solution to be treated by my process was comprised of between 50–75% isopropyl alcohol, 10–30% of ethylene glycol. About 5–15% of the mixture was comprised of water, salts and various organic dyes. The dyes were such that if the solutions were heated to as high as 150° C., decomposition took place. Tarry masses were formed and the solutions discolored, rendering them practically unusable. It is therefore apparent that the solutions could not be heated to the boiling point of ethylene glycol (197.5° C.).

This mixture containing the aforementioned components, was fed through conduit 2 into base heater 11. Heat was applied to base heater 11 and a mixture of isopropyl alcohol and water was distilled off through conduit 4. This mixture was condensed and passed through 7 to the conduit junction, where a portion was returned through 8 for reflux. The remainder of the condensate was removed through conduit 9. By this procedure it was possible to distill off all of the alcohol and part of the water at temperatures below 100° C. The isopropyl alcohol and water formed an azeotrope comprising about 88% alcohol and 12% water. In the event that insufficient water were present, it is of course possible to add, reflux or otherwise furnish sufficient water to permit the removal of the isopropyl alcohol as an azeotrope. Or, the alcohol and water that is present may be distilled off.

The isopropyl alcohol and water removed through conduit 9 may be mixed with anhydrous glycerin or anhydrous glycol or other material and used industrially. Or, the isopropyl alcohol may be distilled in a variety of ways to produce anhydrous isopropyl alcohol. For example, the methods of distilling alcohol described in German Patents 142,502 and 287,897 might be employed. Or, the method described in British 354,553 might be employed. This latter patent describes a process which comprises distilling a mixture of alcohol and water in the presence of an "appropriate" amount of ethylene chloride. The azeotrope of ethylene chloride-water alcohol is condensed and permitted to separate into layers. The layer predominating in water but containing some alcohol, is passed to a distillation treatment. However, in the present instance, should I follow the aforementioned alcohol processes, I would prefer to store the aforementioned water layer and employ it in freeing the still from the alcohol rectification treatment. That is, when operation in the column is to be discontinued, this aqueous solution may be fed therethrough for distillation.

The residue from treatment in column 3 passes through conduit 16 into the base heater 11. This residue now comprises glycol, water, dyes and salts and may be withdrawn through conduit 17 to the tank 21. Preferably, a constant amount is regularly fed through conduit 18 into an intermediate section of column 19. Preferably, the feed is introduced in the vicinity of the midpoint or upper portion of the column. In any event, precaution is taken that any large amount of glycol fed is not allowed to flow down the column and into the base heater.

In order to prevent the glycol from flowing to these parts of the column the feed and heat supply to the lower portion of column 19 are so controlled that the temperature thereof is not allowed to go below 112° C., inasmuch as this is suitable for the pressure (1–2 lbs. gauge) prevailing at this point in the column. In addition to this procedure, the heated trap 34 provided in the line 32—33 functions to catch any glycol which may drain back from the base of the column. This device prevents any glycol from entering the still pot or base heater 29. I have found it desirable for most efficient heating that the glycol be prevented from coming in contact with the heating coils in the base heater. If the heating coils should come in contact with the glycol, not only is efficiency of heat transfer diminished, but decomposition of the glycol through heating may take place.

The base heater then is charged with a hydrocarbon boiling below 140° C. I have found that toluene is a particularly suitable and readily available liquid for this purpose. Sufficient heat is applied to the toluene so that the toluene vapors pass through conduit 28 and into the lower portion of column 19. As already indicated, it is preferred that the temperature of these vapors be sufficiently high so that the bottom of column 19 will be above a temperature of 110° C.–112° C.

During the first part of this distillation treatment there will be a predominance of water with respect to water and glycol, distilling through conduit 22. However, after the process has been in operation for a short time, the mixture of water and glycol which separates from the toluene in the separator 24 will contain approximately the same concentration of ethylene glycol as in the feed mixture passed through at 18. That is, it will be noted that there is no particular dehydration of the glycol but the toluene carries over the glycol and water at temperatures around about 109° C.

During the distillation, the salts, dyes and other such contaminating components in the original mixture accumulate in the column 19 together with small amounts of glycol. This mixture is fluid at the temperature obtaining in the column and may be withdrawn therefrom. In other words, by my novel procedure I am able to separate the high boiling glycol from admixture with other components, at a sufficiently low temperature that a minimum of decomposition and discoloration of the glycol takes place. The glycol-water withdrawn through conduit 27 may be further treated or, if desired, may be mixed with further glycol and alcohol for re-use in various industrial processes.

As already indicated, the toluene readily separates in separator 24 and may be returned to the system. Any toluene (usually 1% or less) carried out with the glycol and water may be removed therefrom by mixing said solution with isopropyl alcohol and at some later time distilling. The toluene forms a constant boiling mixture with the isopropyl alcohol and is eliminated from the glycol. The toluene may be readily separated from the alcohol by washing the alcohol vapors with water or other solvent which carries down the alcohol and permits the toluene to pass.

From the preceding, it is apparent that I have provided a simple and effective method whereby glycol may be recovered at sufficiently low temperatures to avoid difficulties heretofore encountered, due to decomposition and discoloration. While in my process a vacuum is unnecessary, it is to be understood that some reduced pressure might be applied to my process without disadvantage. In this event, my process may be caused to operate at still lower temperatures. Or, I may use reduced pressure and operate at the same temperature. This would result in the use of a smaller quantity of the hydrocarbon or other agent. That is, when operating without reduced pressure, I prefer that some excess of toluene (i. e. agent) be present in the liquid phase. However, when operating with reduced pressure I may carry out the distillation without the presence of the agent in the liquid phase.

While in the above example I have described the use of toluene inasmuch as this is my preferred agent and since it is particularly satisfactory and commercially available, there are other agents which may be employed. For example, octane, ethyl benzene or various other hydrocarbon materials boiling not higher than 150° C. might be employed. In the event that the higher boiling agents are employed, a slight degree of reduced pressure might be usefully employed.

Halogenated hydrocarbons may be used. Examples are, ethylene bromide, and chlorobenzene. However, these agents are more expensive and tend to hydrolyze, hence, others are preferred. In general, therefore, there may be employed hydrocarbons and halogenated hydrocarbons which are substantially immiscible with water and the glycol and boiling in the range 100–150° C. Also, the isopropyl alcohol may be distilled in the presence of oxalic acid or other ammonia binding agent (in addition to entrainer).

Although as described in my preferred embodiment I employ a heated settling tank 34, it is to be understood that provided the lower portion of the column 19 is heated to a sufficiently high temperature, this device may be dispensed with. That is, I find it desirable to keep the glycol out of contact with the heating coils and other procedure for accomplishing this object may be employed.

For example, the arrangement of Fig. 2 discloses wherein this may be carried out. This set-up, functions somewhat similar to that already described with respect to Fig. 1. However, in Fig. 2 the feed may be direct to the still pot because a major portion of the heat is supplied to the hydrocarbon in the device 66. In addition, by the set-up of Fig. 2, the water may be first distilled off and thereafter a toluene (or other hydrocarbon) glycol mixture distilled. When this mixture is decanted in 54 anhydrous glycol may be obtained.

Since my invention functions particularly satisfactorily on ethylene glycol which is susceptible to decomposition, my invention may, of course, be applied to other polyhydric alcohol compounds and the like, which have heretofore been treated by vacuum distillation.

From the foregoing it is apparent that my invention is susceptible to some modification, hence, I do not wish to be restricted excepting insofar as is necessitated by the prior art and the spirit of the appended claims.

I claim:

1. A process for the treatment of aqueous solutions containing at least one monohydroxy alcohol, and at least one polyhydroxy alcohol, salts and dyes to recover said alcoholic compounds without substantial decomposition or discoloration thereof, which comprises subjecting said solution to distillation at temperatures below 100° C. for the removal of substantially all the monohydroxy alcohol and some water, passing the residue solution comprising the polyhydroxy alcohol, water, dyes and salts to an intermediate section of a column having a base heater charged with a hydrocarbon agent substantially immiscible with water and the polyhydroxy alcohol, of a boiling point less than 140° C., distilling the solution so that no material amount of said polyhydroxy alcohol enters the base heater, removing at a temperature below 140° C. a distillate of said agent, polyhydroxy alcohol and water, condensing the distillate, permitting the distillate to separate into layers, returning the layer containing the largest amount of the agent to the distillation step, and withdrawing aqueous polyhydric alcohol free of dyes and salts from the other layer.

2. A process for recovering ethylene glycol without substantial discoloration or decomposition thereof from admixtures with water, dyes and salts, which comprises distilling said admixture in a column in the presence of a hydrocarbon agent substantially immiscible with water and glycol, of a boiling point between about 110° C.–130° C., maintaining the lower part of the column at a temperature greater than 110° C. so that no substantial amount of the glycol passes therebelow, removing a distillate of glycol-water-agent, separating agent and returning it to the column, and withdrawing from the distillate a glycol substantially free of dyes and salts.

3. A process for the treatment of aqueous solutions comprised principally of isopropyl alcohol, ethylene glycol, salts and dyes to recover said alcoholic compounds without substantial decomposition or discoloration thereof, which comprises subjecting said solution to distillation at temperatures below 100° C. for the removal of substantially all the isopropyl alcohol and some water, passing the residue solution comprising the glycol, water, dyes and salts to an intermediate section of a column having a base heater charged with toluene, distilling the materials so that the temperature of the lower part of said column does not drop substantially below about 112° C. whereby said glycol does not enter the base heater, removing at a temperature less than 115° C. a distillate of toluene, glycol and water, condensing the distillate, permitting the distillate to separate into layers, returning the layer containing the largest amount of the toluene to the distillation step, and obtaining aqueous glycol from the other layer.

4. A process for recovering ethylene glycol without substantial discoloration or decomposition thereof from admixtures with water, dyes and salts, which comprises distilling said admixture in a column in the presence of toluene, maintaining the lower part of the column at a temperature greater than 110° C. to prevent any substantial amount of glycol flowing there below, removing a distillate of glycol-water-toluene, separating a toluene layer for return to the process, and obtaining substantially undecomposed and uncolored glycol from the distillate.

5. A process for the treatment of aqueous solutions containing more than 10% ethylene glycol and salts and dyes to recover said glycol without substantial decomposition or discoloration thereof, which comprises passing the solutions comprising the glycol, water, dyes and salts to an intermediate section of a column having the heated portion charged with at least one of the hydrocarbon agents, toluene, tetrachlorethane and octane, distilling the materials so that the glycol does not come in direct contact with the heated portion, removing at a temperature below 150° C. a distillate of said agent, glycol and water, condensing the distillate, permitting the distillate to separate into layers, employing at least a part of the layer containing the largest amount of the agent for reflux to the aforementioned distillation, and obtaining the glycol from the other layer.

6. A process for recovering polyhydroxy alcohols without substantial discoloration or decomposition thereof from aqueous admixtures, which comprises distilling said admixture in a column in the presence of a hydrocarbon agent boiling between about 100° C.–140° C., maintaining the lower part of the column at a temperature greater than 100° C., but below 140° C., keeping the polyhydroxy alcohol out of contact with the major portion of the direct source of heat input to the column, removing a distillate, separating agent from the distillate for return to the column, and withdrawing polyhydroxy alcohol and water from the distillate.

7. A process for the treatment of aqueous solutions containing 50–80% isopropyl alcohol, 5%–20% glycol and the balance water, toluene, salts and dyes to recover said hydroxy compounds without substantial decomposition or discoloration thereof, which comprises subjecting said solution to distillation for the removal of substantially all the alcohol and some water, in an azeotrope comprising approximately 88% alcohol, 12% water, withdrawing glycol, water, dyes and salts to intermediate section of a column having a base heater charged with toluene, distilling the materials so that said glycol does not enter the base heater, removing at a temperature less than 120° C. a distillate of toluene, glycol and water, condensing the distillate, permitting the distillate to separate into layers, returning the layer containing the largest amount of the toluene to the distillation step and obtaining from the other layer glycol approximately the same concentration as in the feed solution.

8. A process for recovering ethylene glycol without substantial discoloration or decomposition thereof from admixtures with approximately 25% water, dyes and salts, which comprises distilling said admixture in the presence of toluene, maintaining the glycol out of contact with the direct heat input to the distillation, removing a distillate of glycol, water-toluene, and withdrawing an approximate 75% glycol and 25% water mixture from the distillate.

9. A process for recovering ethylene glycol from unclear aqueous solutions, which comprises distilling the glycol substantially out of contact with the direct heat input to the distillation and in the presence of a substantial amount of hydrocarbon of a boiling point between 100–150° C. to recover said glycol in an aqueous condition and containing not more than 5% of the hydrocarbon, forming a mixture of the glycol with isopropyl alcohol, and thereafter distilling at least a part of the mixture to vaporize a cut containing isopropyl alcohol-hydrocarbon.

WEBSTER E. FISHER.